United States Patent
Kim et al.

(12) United States Patent (10) Patent No.: US 8,761,557 B2
(45) Date of Patent: Jun. 24, 2014

(54) COMPACT OPTICAL FIBER AMPLIFIER

(75) Inventors: Sung Jun Kim, Suwon-si (KR); Jeong Mee Kim, Suwon-si (KR); Soo Young Yoon, Yongin-si (KR); Meong Kyu Choi, Suwon-si (KR); Jung Kwon Lee, Suwon-si (KR)

(73) Assignee: Licomm Co., Ltd., Yongin-si, Gyeonggi-do (KR)

( * ) Notice: Subject to any disclaimer, the term of this patent is extended or adjusted under 35 U.S.C. 154(b) by 25 days.

(21) Appl. No.: 13/315,267

(22) Filed: Dec. 8, 2011

(65) Prior Publication Data

US 2012/0230632 A1    Sep. 13, 2012

(30) Foreign Application Priority Data

Mar. 7, 2011   (KR) .................. 10-2011-0019873

(51) Int. Cl.
| | |
|---|---|
| G02B 6/26 | (2006.01) |
| G02B 6/00 | (2006.01) |
| G02B 6/12 | (2006.01) |
| G02B 6/42 | (2006.01) |
| H01S 3/00 | (2006.01) |
| H04B 10/25 | (2013.01) |

(52) U.S. Cl.
USPC ................ 385/31; 385/14; 385/15; 385/30; 385/32; 359/333; 359/341.1

(58) Field of Classification Search
CPC ...... G02B 6/262; G02B 6/4214; G02B 6/2852
USPC .......... 385/14, 15, 30–32; 359/134, 160, 337, 359/341, 333, 341.1
See application file for complete search history.

(56) References Cited

U.S. PATENT DOCUMENTS

| | | | | |
|---|---|---|---|---|
| 6,292,291 | B1 * | 9/2001 | Yoon et al. | 359/337.13 |
| 6,339,494 | B1 * | 1/2002 | Hwang et al. | 359/337.1 |
| 6,917,731 | B2 * | 7/2005 | Bennett et al. | 385/15 |
| 2007/0097491 | A1 * | 5/2007 | Jenkins et al. | 359/337.4 |

* cited by examiner

*Primary Examiner* — Charlie Peng
*Assistant Examiner* — Hung Lam
(74) *Attorney, Agent, or Firm* — Novick, Kim & Lee, PLLC; Jae Youn Kim (57) ABSTRACT

The present invention provides a compact optical fiber amplifier, which can minimize the size of an optical module and increase the degree of freedom in mounting the module on a board. The compact optical fiber amplifier according to the present invention includes: an optical module including a plurality of optical elements provided therein, an input port for introducing an optical fiber thereinto, and an outlet port for extract the optical fiber to the outside of the module; and a plurality of optical fibers introduced into or extracted from the optical module through the input port or the outlet port of the optical module and disposed above a predetermined radius of curvature on the outside of the optical module.

6 Claims, 8 Drawing Sheets

Fig. 1

(PRIOR ART)

Fig. 2

(PRIOR ART)

COMPACT OPTICAL FIBER AMPLIFIER

CROSS-REFERENCE TO RELATED PATENT APPLICATION

This application claims the benefit of Korean Patent Application No. 10-2011-0019873, filed on Mar. 7, 2011, in the Korean Intellectual Property Office, the disclosure of which is incorporated herein in its entirety by reference.

BACKGROUND OF THE INVENTION

1. Field of the Invention

The present invention relates to an optical fiber amplifier and, more particularly, to a compact optical fiber amplifier, which can minimize the size of an optical module and increase the degree of freedom in mounting the module on a board.

2. Description of the Related Art

At present, an optical communication system which is configured to perform signal transmission between devices located in remote locations using optical signals has been widely spread and used. Moreover, the use of an optical fiber amplifier, which is configured to amplify an optical signal as it is without converting the optical signal into an electrical signal, also increases dramatically. The optical fiber amplifier employs an erbium-doped fiber, for example, as an optical amplifying means.

Figure 1:
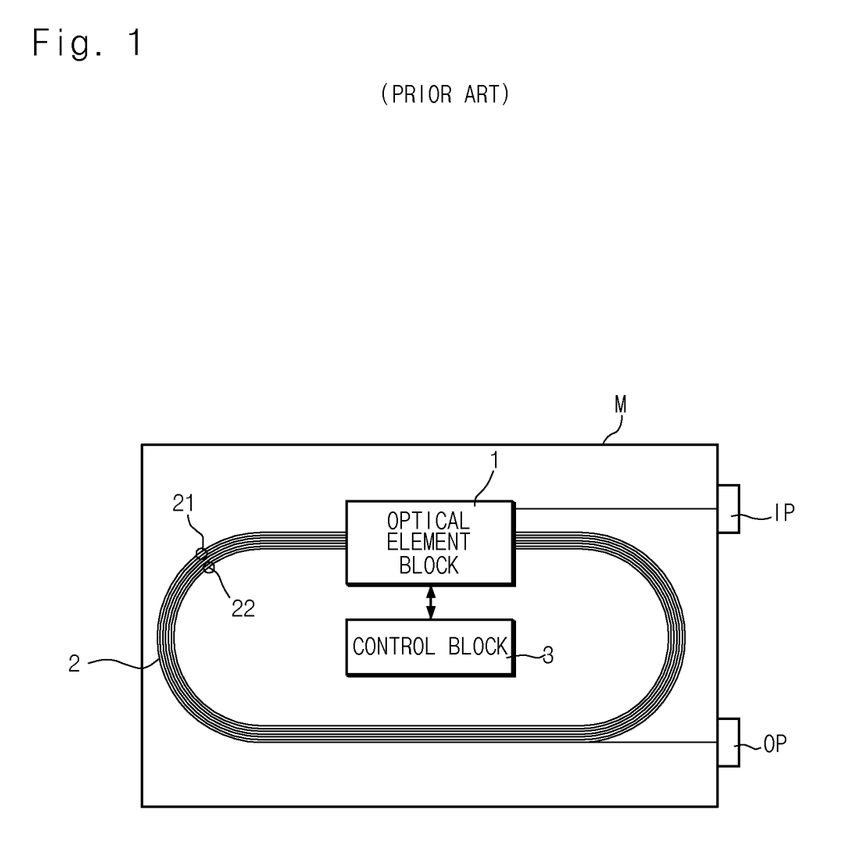
FIG. 1 is a schematic diagram showing the configuration of a conventional optical fiber amplifier module.

FIG. 1 is a schematic diagram showing the configuration of a conventional optical fiber amplifier module M employing an optical amplification optical fiber.

In the figure, the optical fiber amplifier module M comprises an optical element block 1 composed of at least one optical element constituting an optical fiber amplifier, an optical fiber block 2 composed of a connection optical fiber 21 for optically interconnecting the optical elements provided in the optical element block 1 and an optical amplification optical fiber 22, and a control block 3 for controlling the overall operation of the optical fiber amplifier. Moreover, an optical input port IP for introducing an external light into the optical fiber module M and an optical output port OP for outputting an amplified light from the optical fiber module M are provided on the outside of the optical fiber module M.

The above-described optical fiber module M is mounted on a board together with other modules in a communication system to provide the function of amplifying an optical signal transmitted and received through the communication system.

However, recently, as the reduction in size and weight of the communication systems or devices has rapidly proceeded, the size of the board detachably inserted into the communication system, for example, in the form of a card is also gradually reduced. Accordingly, the reduction in size of the module or device mounted on the board is also required.

Figure 2:
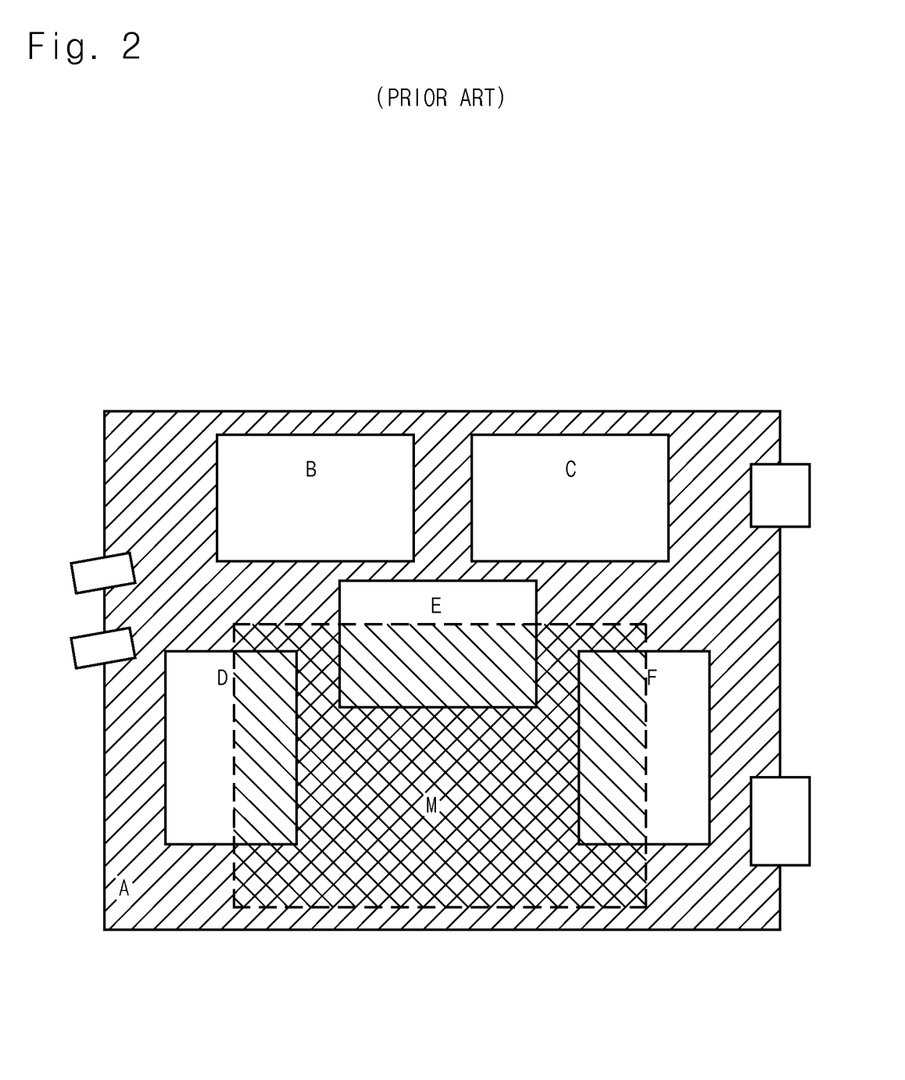
FIG. 2 is a plan view showing the configuration of an optical communication board on which the optical fiber amplifier module of FIG. 1 is mounted.

FIG. 2 is a plan view showing an example of the configuration of a board employed in an optical communication system or device.

In FIG. 2, reference numeral A is a board detachably connected to a communication device, for example, in the form of a card. An optical fiber amplifier module M and other communication modules B, C, D, E and F are disposed on the board A. Here, the communication modules may include a power module, a transceiver module, a control module, etc. As mentioned above, with the reduction in size and weight of the communication devices, the size of the board mounted on the device is also reduced. As shown in FIG. 2, when the communication modules B, C, D, E and F are disposed on the downsized board, there is no enough space on the board, and thus the space in which the optical fiber amplifier module M is to be installed is not sufficient. For reference, the optical fiber amplifier module M shown in FIG. 2 has a size corresponding to that of an actual board A of a conventional standardized optical fiber amplifier module.

To solve the above-described problems, it is necessary to minimize the size of the optical fiber amplifier module M and mount the downsized optical fiber amplifier module M in the space on the board A. As described with reference to FIG. 1, the optical fiber amplifier module M is provided with the optical fiber block 2 as well as the optical element block 1 and the control block 3. The connection optical fiber 21 and the optical amplification optical fiber 22, which constitute the optical fiber block 2, are configured to be wound to minimize the installation space thereof. Here, when the optical fibers are wound, it is necessary to maintain the radius of curvature of the optical fibers above a predetermined level so as to prevent the transmission loss of the optical signal transmitted through the corresponding optical fiber. Therefore, it is very difficult to reduce the size of the optical fiber amplifier module M below a predetermined size.

For these reasons, the size of the optical fiber amplifier module M should be maintained above a predetermined size, and thus the size of the board A on which the optical fiber amplifier module M is mounted should also be maintained above a predetermined size, which poses a significant obstacle to reducing the size of the optical communication system or device.

SUMMARY OF THE INVENTION

The present invention has been made in an effort to solve the above-described problems associated with prior art, and an object of the present invention is to provide a compact optical fiber amplifier, whose size is minimized to significantly increase the degree of freedom in installation such that the size of an optical communication board on which the optical fiber amplifier is mounted can be significantly reduced.

According to a first aspect of the present invention to achieve the above object, there is provided a compact optical fiber amplifier comprising: an optical module including a plurality of optical elements provided therein, an input port for introducing an optical fiber thereinto, and an outlet port for extract the optical fiber to the outside of the module; and a plurality of optical fibers introduced into or extracted from the optical module through the input port or the outlet port of the optical module and disposed above a predetermined radius of curvature on the outside of the optical module, wherein the optical fibers comprise a plurality of connection optical fibers for connecting the optical elements and an optical amplification optical fiber for amplifying an optical signal, and wherein one end of at least one of the plurality of connection optical fibers is coupled to one of the optical elements and the other end thereof is extracted to the outside through the output port, introduced into the optical module through the input port, and then coupled to the other optical element.

One end of the optical amplification optical fiber may be coupled to one of the optical elements and the other end thereof may pass thorough the input port and the output port of the optical module at least twice and may be disposed above a predetermined radius of curvature on the outside of the optical module.

The optical module may further comprise a guide provided therein to stably fix or support the optical fibers.

According to a second aspect of the present invention to achieve the above object, there is provided a compact optical fiber amplifier comprising a plurality of optical elements, a connection optical fiber for connecting the optical elements, and an optical amplification optical fiber for amplifying an optical signal, wherein the compact optical fiber amplifier comprises at least two optical modules, wherein each of the optical modules comprises at least one optical element, an input port for introducing the optical fibers thereinto, and an outlet port for extract the optical fibers to the outside of the module, wherein the optical fibers are introduced into or extracted from the optical module through the input port or the outlet port of the optical module, coupled to the optical element provided in the optical module, and disposed above a predetermined radius of curvature on the outside of the optical module, and wherein the optical fibers comprise the connection optical fibers for connecting the optical elements and the optical amplification optical fiber for amplifying the optical signal.

The plurality of optical elements may comprise active elements and passive elements, the active elements and passive elements being provided in different optical modules.

The optical fiber extracted from one of the optical modules may be introduced into the other optical module.

The optical amplification optical fiber may pass through the at least two optical modules at least twice and may be disposed above a predetermined radius of curvature on the outside of the optical modules.

Each of the optical modules may further comprise a guide provided therein to stably fix or support the optical fibers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

First, the configuration of an optical fiber amplifier to which the present invention is applied will be described with reference to FIG. 3.

Figure 3:
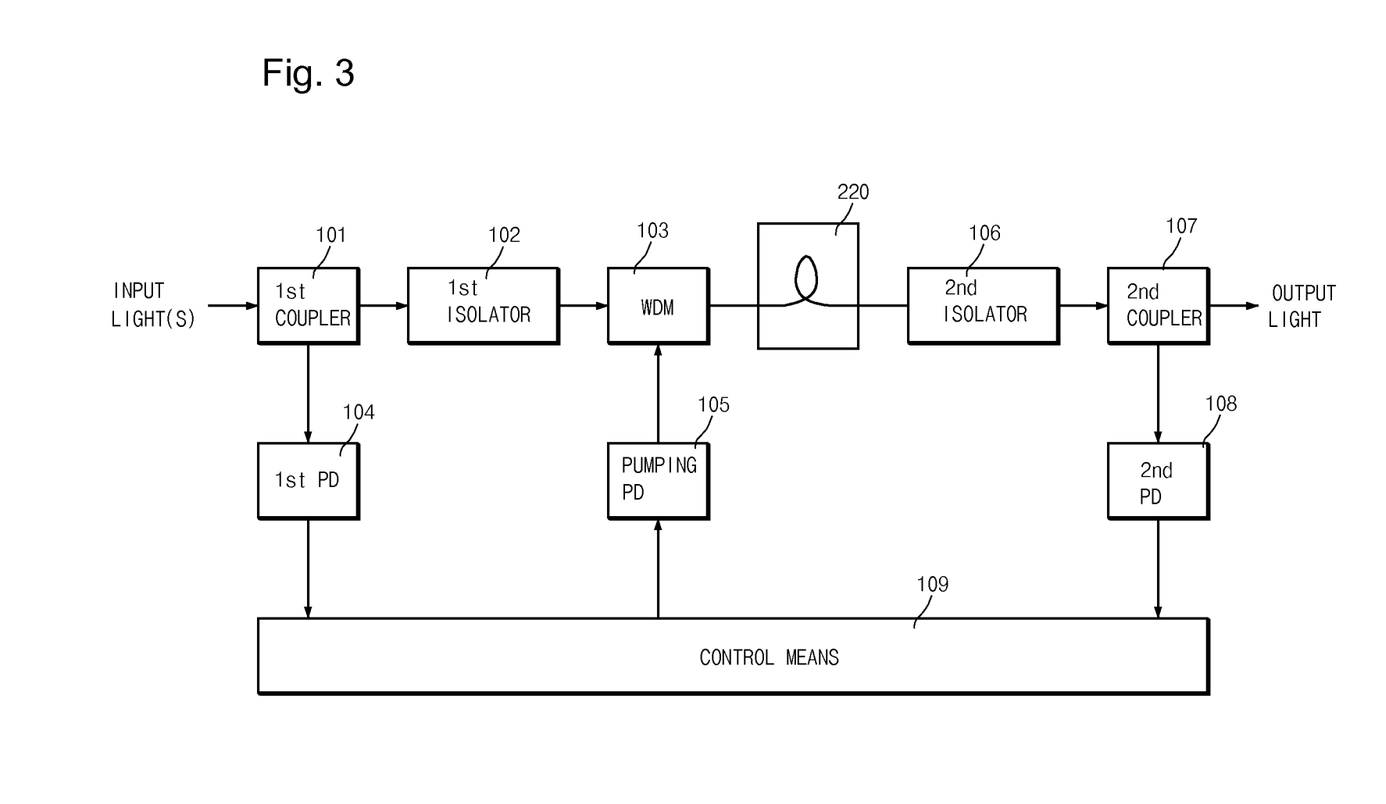
FIG. 3 is a schematic diagram showing the configuration of an optical fiber amplifier to which the present invention is applied.

FIG. 3 is a block diagram showing an example of the configuration of the optical fiber amplifier.

In the figure, an optical signal (s) input from the outside is coupled to an input end of a first coupler 101. The first coupler 101 divides the input optical signal in a predetermined ratio, for example, 99:1 and couples each divided portion of the optical signal to a first isolator 102 and a first photodiode 104. The first isolator 102 is to prevent the optical signal or a pumping light from traveling in a reverse direction.

The optical signal traveling through the first isolator 102 is input to a wavelength division multiplexer (WDM) 103. The WDM 103 provides the optical signal input from the first isolator 102 and a pumping light applied from a pumping laser diode 105 to an optical amplification optical fiber 220. The optical amplification optical fiber 220 may be composed of an erbium-doped fiber, for example.

Then, the optical signal output from the optical amplification optical fiber 220 is applied to a second coupler 107 through a second isolator 106. The second isolator 106 is to prevent the optical signal and the like from traveling in a reverse direction in the same manner as the first isolator 102.

The second coupler 107 divides the light input from the second isolator 106 in a predetermined ratio, for example, 99:1 and outputs each divided portions of the optical signal as an output light and to a second photodiode 108.

The first and second photodiodes 104 and 108 photoelectrically convert the light applied from the first and second coupler 101 and 107 into an electrical signal having a level corresponding to the intensity of the input light, respectively. The electrical signals converted in the above manner are input to a control means 109.

The control means 109 controls the output level of the pumping light of the pumping laser diode 105 based on the levels of the electrical signals applied from the first and second photodiodes 104 and 108, thereby appropriately controlling the optical amplification level of the optical amplification optical fiber 220.

In the above configuration, the first and second couplers 101 and 107, the first and second photodiodes 104 and 108, the first and second isolators 102 and 106, the WDM 103, and the pumping laser diode 105 are all optical elements, which are connected to each other through the optical fiber. In the present specification, the optical fiber for interconnecting these optical elements will be referred to as a connection optical fiber.

Figure 4:
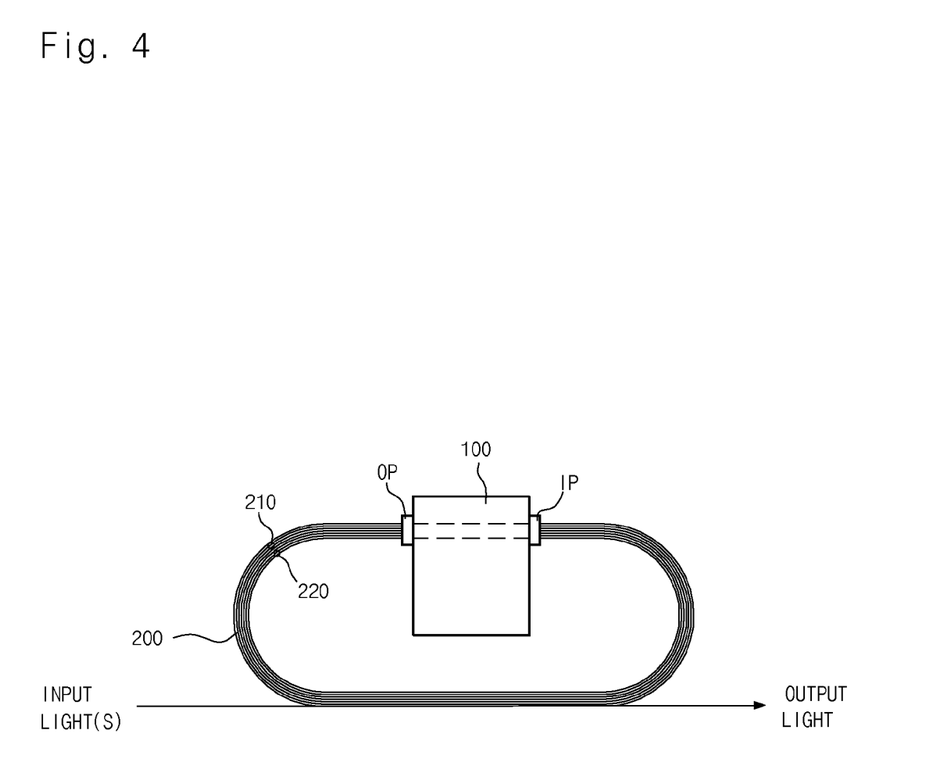
FIG. 4 is a schematic diagram showing the configuration of a compact optical fiber amplifier in accordance with a first embodiment of the present invention.

FIG. 4 is a schematic diagram showing the configuration of a compact optical fiber amplifier in accordance with a first embodiment of the present invention.

As shown in FIG. 4, the compact optical fiber amplifier in accordance with the preferred embodiment of the present invention comprises an optical module 100, which comprises a plurality of optical elements and a control means, and a plurality of optical fibers 200 connected to the optical elements provided in the optical module and wound on the outside of the optical module 100.

The optical elements provided in the optical module 100 may include couplers 101 and 107, isolators 102 and 106, photodiodes 104 and 108, and a pumping laser diode 105 as described with reference to FIG. 3. Of course, the optical module 100 may include other optical elements than the above-described optical elements. The type and number of these optical elements may vary according to the configuration of the optical fiber amplifier.

The optical fibers 200 comprises a plurality of connection optical fibers 210 connected to the plurality of optical elements disposed in the optical module 100 and an optical amplification optical fiber 220 composed of an erbium-doped fiber, for example. Here, the connection optical fibers 210 and the optical amplification optical fiber 220 are wound to form a plurality of lines, and each optical fiber is introduced into the optical module 100 through an input port IP of the optical module 100 and extracted through an outlet port OP of the optical module 100.

Figure 5:
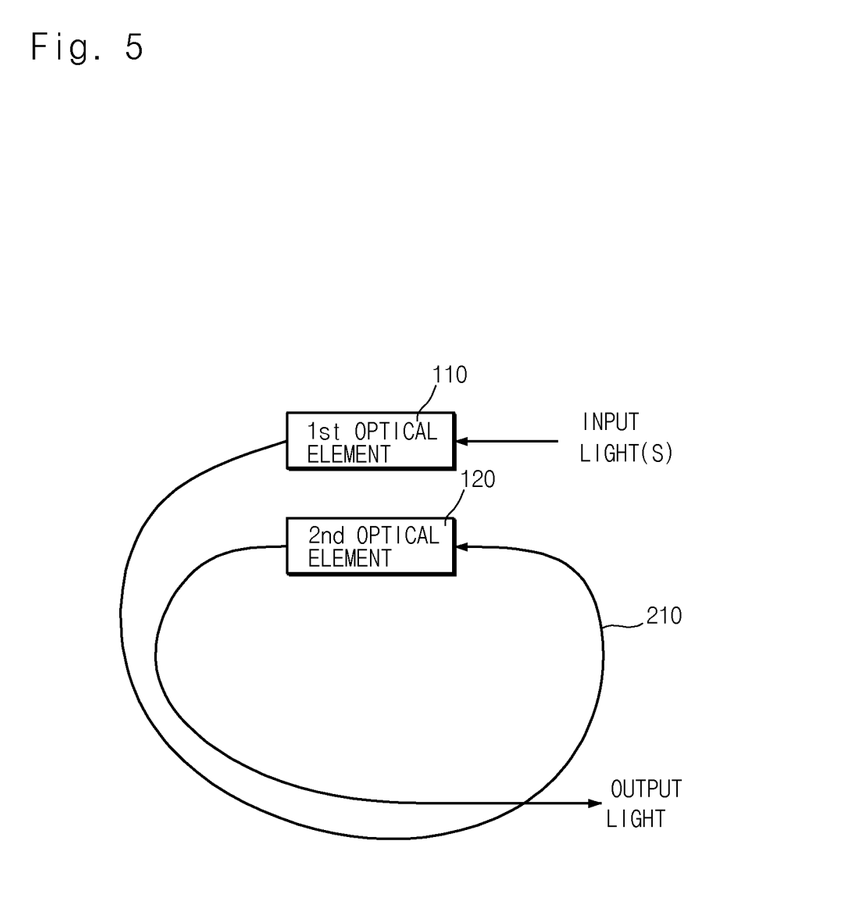
FIG. 5 is a schematic diagram showing the connection between a connection optical fiber shown in FIG. 4 and optical elements disposed in an optical module.

Moreover, as shown in FIG. 5, the connection optical fibers 210 input to the optical module 100 through the input port IP shown in FIG. 4 is coupled to an input end of a first optical element 110. The connection optical fiber 210 coupled to an output end of the first optical element 110 is extracted to the outside of the optical module 100 through the output port OP of the optical module 100. Subsequently, the connection optical fiber 210 extends in the shape of a circle or oval and is then coupled to an input end of a second optical element 120 through the input port IP of the optical module 100. The connection optical fiber 210 coupled to an output end of the second optical element 120 is extracted to the outside of the optical module 100 through the output port OP of the optical module 100, thereby connecting the optical elements 110 and 120.

Although not shown in the figures, in the case of the optical amplification optical fiber 220, one end thereof will be coupled to an output end of one optical element, that is, the WDM 103 of FIG. 3, wound to penetrate the optical module 100 for the corresponding length, and then coupled to an input end of the other optical element, that is, the second isolator 106 of FIG. 3. The optical amplification optical fiber 220 will be wound to pass through the inside of the optical module 100 at least twice.

FIG. 5 shows that the optical elements are simply connected to each other by the connection optical fiber 210. It will be understood by those skilled in the art that the number of optical elements provided in the optical module 100 is not limited to a specific value.

Moreover, although not shown in the figures, a guide for stably fixing or supporting the connection optical fibers 210 or the optical amplification optical fiber 220 may be provided in the optical module 100.

Figure 6:
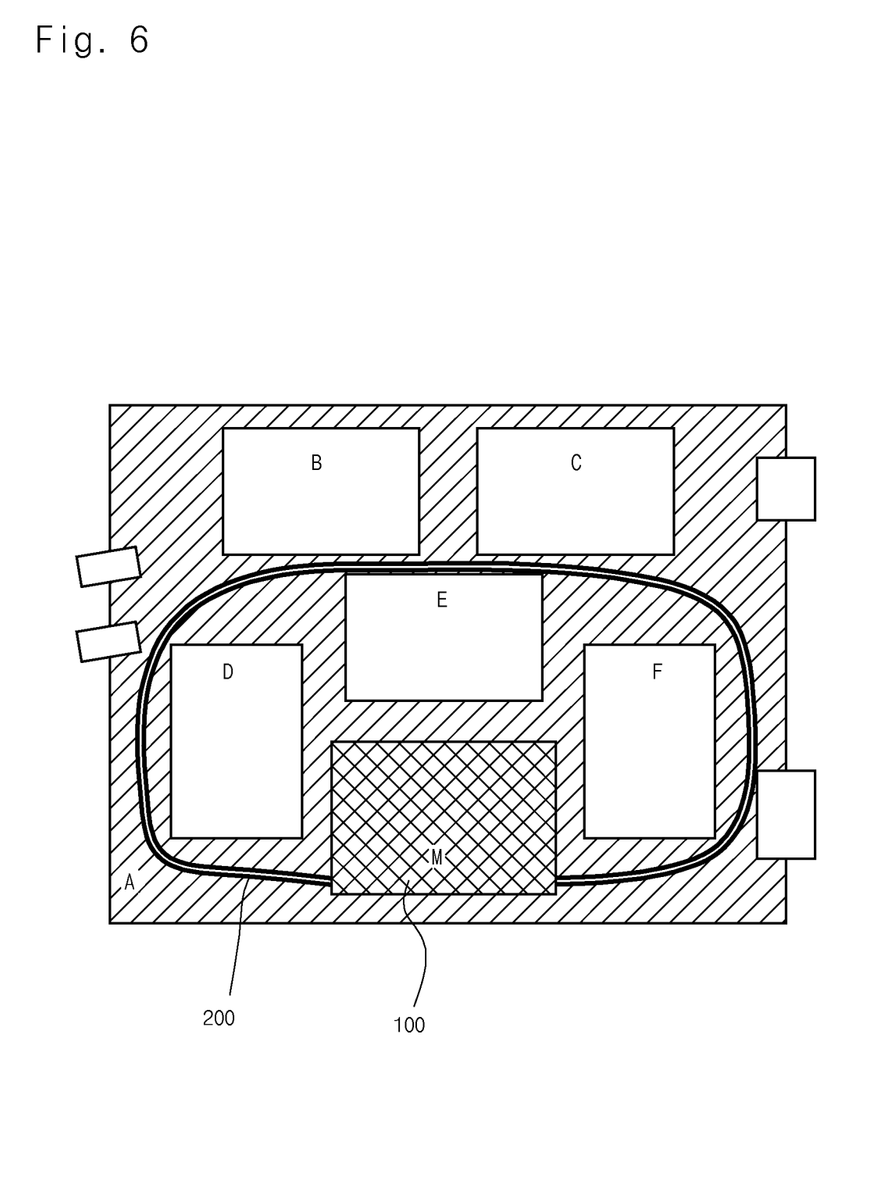
FIG. 6 is a schematic diagram showing a state in which the compact optical fiber amplifier shown in FIG. 4 is mounted on the optical communication board shown in FIG. 2.

FIG. 6 shows a state in which the compact optical fiber amplifier shown in FIG. 4 is mounted on an optical communication board shown. The configuration shown in FIG. 6 corresponds to the conventional configuration shown in FIG. 2, and the same elements as in FIG. 2 have the same reference numerals.

According to the conventional optical fiber amplifier module M shown in FIGS. 1 and 2, all of the optical element block 1, the optical fiber block 2, and the control block 3 are provided in the module M. Therefore, the size of the optical fiber amplifier module M is inevitably increased.

On the contrary, according to the optical fiber amplifier in accordance with the preferred embodiment of the present invention, the optical fibers 200 comprising the connection optical fibers 210 and the optical amplification optical fiber 220 are disposed on the outside of the optical module 100. As a result, the size of the optical module 100 can be significantly reduced.

As shown in FIG. 6, when the optical fiber amplifier in accordance with the preferred embodiment of the present invention is mounted on a board A, the optical module 100 is mounted in an appropriate space between other communication modules B, C, D, E and F, and the optical fibers 200 are disposed between the communication modules B, C, D, E and F in an appropriate manner, thereby installing the optical fiber amplifier.

Accordingly, when the optical fiber amplifier in accordance with the preferred embodiment of the present invention is employed, the degree of freedom in design of the communication modules B, C, D, E and F disposed on the board A can be significantly increased, and further the size of the board A can be significantly reduced.

Figure 7:
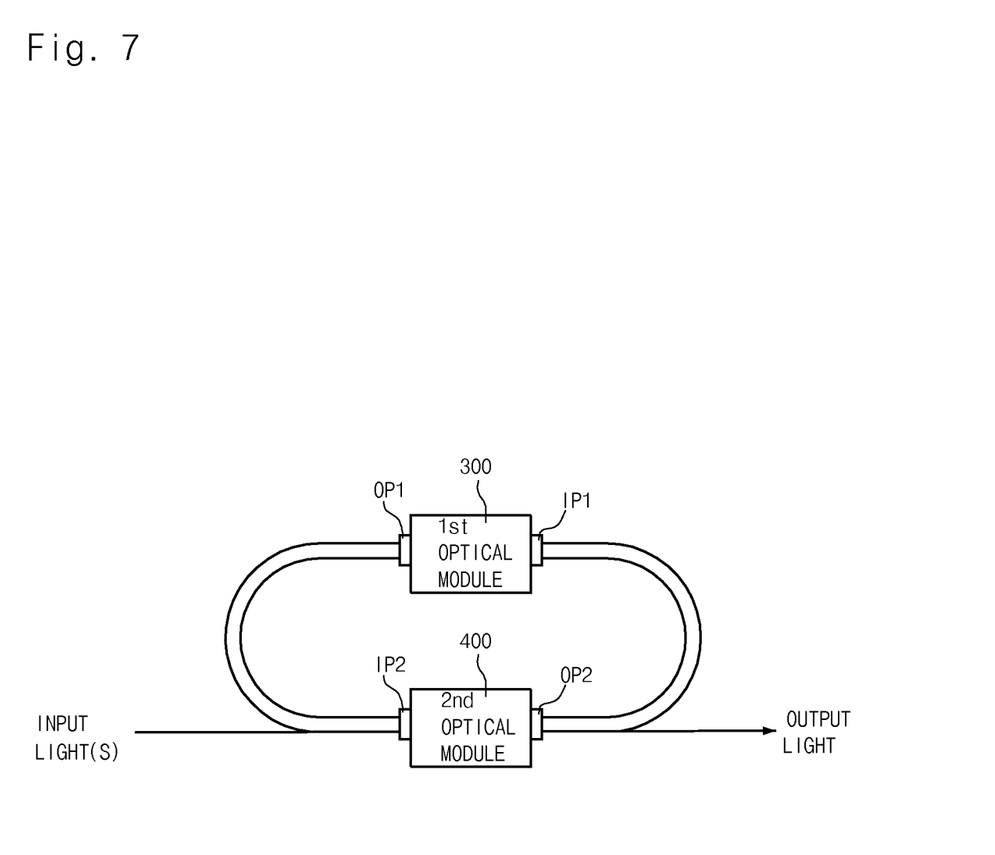
FIG. 7 is a schematic diagram showing the configuration of a compact optical fiber amplifier in accordance with a second embodiment of the present invention.

FIG. 7 is a schematic diagram showing the configuration of a compact optical fiber amplifier in accordance with a second embodiment of the present invention.

In the embodiment of FIG. 7, a plurality of optical modules 100 such as two optical modules 100, for example, are provided in the configuration of the embodiment of FIG. 4. That is, first and second optical modules 300 and 400 are provided in the configuration of FIG. 7, and these first and second optical modules 300 and 400 are connected to each other by optical fibers 200. In the same manner as the embodiment of FIG. 4, the optical fibers 200 also comprise a plurality of connection optical fibers and an optical amplification optical fiber in the this embodiment. Moreover, the optical fibers 200 are disposed above a predetermined radius of curvature between the first and second optical modules 300 and 400.

The optical elements provided in the optical module 100 of FIG. 4 are separately disposed in the first and second optical modules 300 and 400. Preferably, the optical elements provided in the first and second optical modules 300 and 400 are separately disposed based on the use of an external power.

The optical elements provided in the optical fiber amplifier shown in FIG. 3 may be divided into active elements that require an external power and passive elements that require no external power. In FIG. 3, the active elements may include the first and second photodiodes 104 and 108, the pumping laser diode 105, and the control means 109, and the passive elements may include the first and second couplers 101 and 107, the first and second isolators 102 and 106, and the WDM 103.

When the optical elements separately disposed in the first and second optical modules 300 and 400 are divided into the concept of active elements and passive elements, the external power may be supplied to any one of the optical modules 300 and 400, and thus the configuration of the board can be further simplified. Of course, the separate arrangement of the optical elements in the first and second optical modules 300 and 400 is not limited to a specific method.

In FIGS. 3 and 7, when the first optical module 300 is configured with the active elements and the second optical module 400 is configured with the passive elements, a method for connecting the first and second optical modules 300 and 400 using the optical fibers 200 will be described in more detail below.

The connection optical fibers 210, through which external optical signals (s) are transmitted, are introduced into the second optical module 400 through an input port IP2 and coupled to an input end of a first coupler 101. The first coupler 101 includes two output ends. The connection optical fibers 210 coupled to these output ends are extracted to the outside through an output port OP2 of the second optical module 400 and introduced into the first optical module 300 through an input port IP1 of the first optical module 300.

One of the connection optical fibers 210 introduced into the first optical module 300 is coupled to a first photodiode 104 in the first optical module 300, and the other connection optical fiber 210 passes through the first optical module 300, is extracted to the outside through an output port OP1 of the first optical module 300, introduced into the second optical module 400 through the input port IP2 of the second optical module 400, and then coupled to an input end of a first isolator 102. In this way, other optical elements are connected to each other by the connection optical fibers 210.

Meanwhile, in the case of the optical amplification optical fiber 220, it starts from a WDM 103 in the second optical module 400, is extracted through the output port OP2, continuously wound to pass through the first and second optical modules 300 and 400 for the corresponding length, and then coupled to an input end of a second isolator 106 in the second optical module 400.

According to the optical fiber amplifier in accordance with this preferred embodiment of the present invention, the plurality of optical modules are separately disposed, and thus the size of each optical module is further reduced. Therefore, the degree of freedom in design of the communication modules B, C, D, E and F mounted on the board A can be significantly increased, and further the size of the board A can be significantly reduced.

Figure 8:
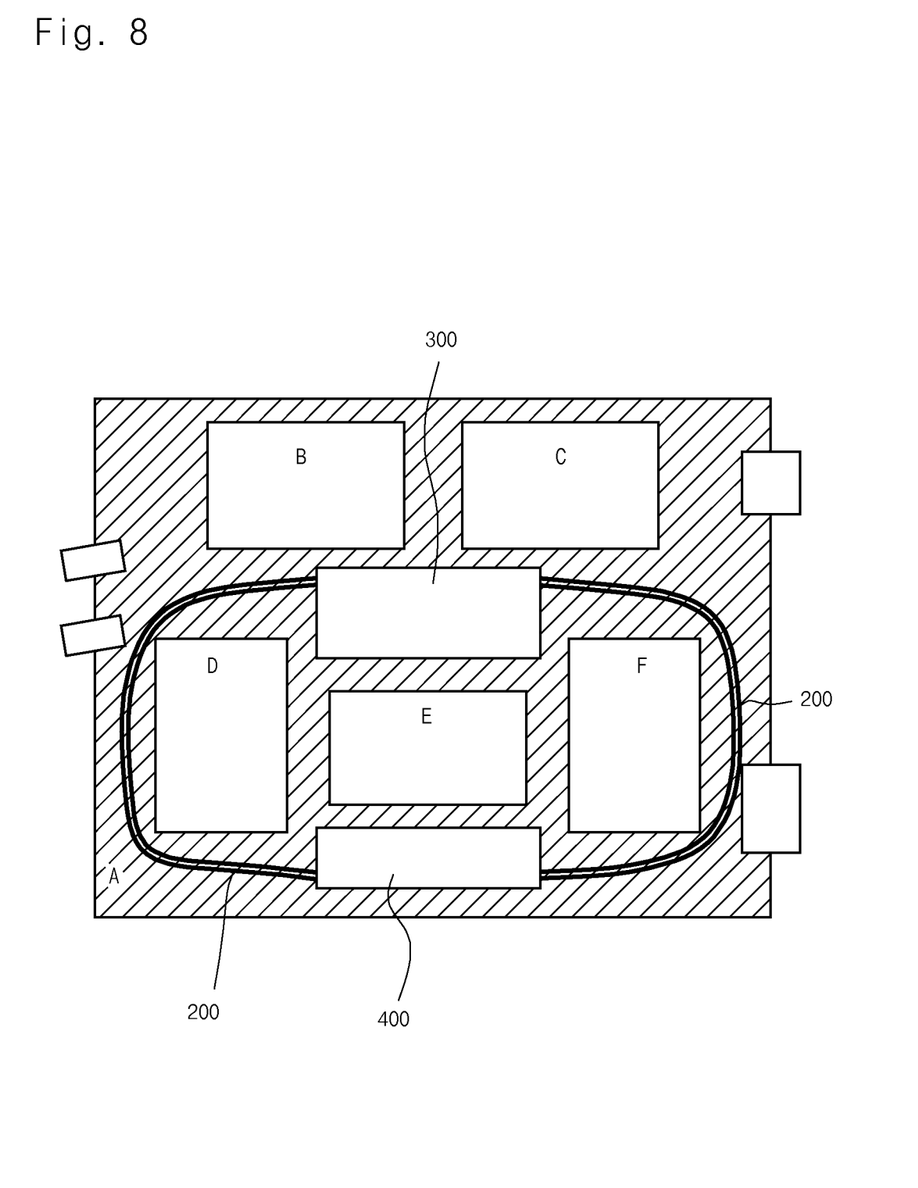
FIG. 8 is a schematic diagram showing a state in which the compact optical fiber amplifier shown in FIG. 7 is mounted on the optical communication board shown in FIG. 2.

FIG. 8 is a schematic diagram showing a state in which the compact optical fiber amplifier shown in FIG. 7 is mounted on the optical communication board shown in FIG. 2.

As can be seen from FIG. 8, according to the optical fiber amplifier in accordance with this preferred embodiment of the present invention, the size of the optical modules 300 and 400 is minimized, and thus the optical modules 300 and 400 can be arranged between the communication modules B, C, D, E and F in an appropriate manner. Moreover, the optical fibers 200 for interconnecting the optical modules 300 and 400 can also be disposed on the board A in an appropriate manner.

Therefore, according to the optical fiber amplifier in accordance with this preferred embodiment of the present invention, when the communication modules B, C, D, E and F are disposed on the board A, the necessity to consider a separate space for the optical fiber amplifier is significantly reduced. As a result, the degree of freedom in design of the board A can be significantly increased, and the size of the board A can be further reduced.

Moreover, FIG. 8 shows an example of the structure for arranging the optical fiber amplifier in accordance with this preferred embodiment of the present invention. According to the optical fiber amplifier in accordance with this preferred embodiment of the present invention, the size of the optical modules is significantly reduced to increase the degree of freedom in design, and thus the arrangement of the optical modules in accordance with this preferred embodiment of the present invention can be arbitrarily modified by a board designer.

As described above, according to the present invention, the optical fibers for interconnecting the optical elements which constitute the optical fiber amplifier are disposed on the outside of the optical module. Moreover, the optical elements are separately disposed in at least one optical module. As a result, according to the optical fiber amplifier of the present invention, the size of the optical module is significantly reduced, and thus when the optical module is mounted on the board, the installation area is significantly reduced.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A compact optical fiber amplifier comprising:
an optical module including a plurality of optical elements provided therein, an input port and an output port; and
a plurality of optical fibers introduced into and extracted from the optical module through the input port and the output port of the optical module, respectively, and forming at least one loop with a predetermined radius of curvature at an outside of the optical module together with the optical module,
wherein the plurality of optical fibers comprises a plurality of connection optical fibers for connecting the optical elements and an optical amplification fiber for amplifying an optical signal,
wherein one end of at least one of the plurality of connection optical fibers is coupled to an output end of one of the plurality of optical elements and another end thereof is extracted to the outside of the optical module through the output port, forming the at least one loop with the predetermined radius of curvature at the outside of the optical module, introduced into the optical module through the input port, and then coupled to an input end of another of the plurality of optical elements, and
wherein one end of the optical amplification fiber is coupled to an output end of one of the plurality of optical elements and another end thereof is extracted to the outside of the optical module through the output port, forming at least two loops with the predetermined radius of curvature at the outside of the optical module by passing through the optical module at least twice and coupled to an input end of another of the plurality of optical elements, and therefore the at least one loop of the plurality of optical fibers comprises the at least two loops of the optical amplification fiber.

2. The compact optical fiber amplifier of claim 1, wherein the optical module further comprises a guide provided therein to stably fix or support the plurality of optical fibers.

3. A compact optical fiber amplifier comprising:
a plurality of optical elements;
a plurality of optical fibers; and
at least two optical modules,
wherein each of the at least two optical modules comprises at least one of the plurality of optical elements, an input port for introducing the plurality of optical fibers thereinto, and an output port for extracting the plurality of optical fibers to an outside of each of the at least two optical modules,
wherein the plurality of optical fibers are introduced into and extracted from each of the at least two optical modules through the input port and the output port of each of the at least two optical modules, respectively, coupled to at least one of the plurality of optical elements provided in each of the at least two optical modules, and forming at least one loop with a predetermined radius of curvature at the outside of the at least two optical modules together with the at least two optical modules,
wherein the plurality of optical fibers comprise a plurality of connection optical fibers for connecting the plurality of optical elements and a plurality of optical amplification fibers for amplifying the optical signal, and
wherein each of the plurality of optical amplification fibers is arranged to form at least two loops with the predetermined radius of curvature at the outside of the at least two optical modules by passing through the at least two optical modules at least twice, and therefore the at least one loop of the plurality of optical fibers comprises the at least two loops of the plurality of optical amplification fibers.

4. The compact optical fiber amplifier of claim 3, wherein the plurality of optical elements comprise active elements and passive elements, and the active elements and the passive elements are separately provided in the at least two optical modules.

5. The compact optical fiber amplifier of claim 3, wherein the plurality of optical fibers extracted from one of the at least two optical modules are introduced into the other one of the at least two optical modules.

6. The compact optical fiber amplifier of claim 3, wherein each of the at least two optical modules further comprises a guide provided therein to stably fix or support the plurality of optical fibers.

\* \* \* \* \*